United States Patent Office 3,205,083
ULTRA-VIOLET ABSORBERS
Harold A. Green, Havertown, Pa., assignor to Air Products and Chemicals, Inc., a corporation of Delaware
No Drawing. Filed July 31, 1961, Ser. No. 127,803
5 Claims. (Cl. 106—176)

This invention relates to methods of imparting resistance to deterioration from sunlight by the inclusion of minor amounts of compounds related to 2,4,5-triphenyl imidazole in compositions containing a major portion of synthetic macromolecular materials such as synthetic plastics, resins, or elastomers. The invention also concerns certain novel compounds.

The useful life of synthetic fibers, films, elastomerics and similar polymeric-type materials can be increased by improvement of the physical and/or esthetic properties. The greater longevity of such macromolecular materials is of considerable importance in practical considerations. Inasmuch as an appreciable proportion of deterioration can result from exposure to light, techniques for minimizing the detrimental effect of the more potent light-forms are highly desirable. The light-forms in and around the ultra-violet range have considerable potency in exhibiting adverse effects on the macromolecular structure of many varieties of polymeric-type materials. Recently, some manufacturers have marketed formulations comprising such materials in combination with small amounts of agents effective in minimizing the damaging nature of sunlight and other light-forms strong in the ultra-violet region and such formulations have been recognized as a marked advance. This advance has merit with macromolecular materials such as polyacrylates, polyolefins, polystyrenes, cellulosics, polyesters, polyvinyls and the like.

Heretofore, 2,4,5-triphenyl imidazole (sometimes designated as lophine) as well as certain derivatives thereof have been described, as in Hofmann's text (1950) on Imidazoles, but there has not been any recommendation for the use of such compounds as ultra-violet absorbers in formulations with macromolecular materials. Derivatives of 4,5-diphenyl imidazole may be prepared by reacting an aromatic aldehyde with ammonia and benzil in the presence of ammonium acetate in acetic acid to form 2-(aryl)-4,5-diphenyl imidazole in accordance with the following equation in which A refers to the aromatic group:

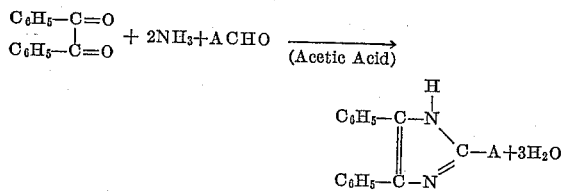

In accordance with the present invention, synthetic macromolecular materials are made more resistant to deterioration when subjected for prolonged periods to sunlight by reason of the ultra-violet absorptivity of a minor concentration of certain derivatives of 2,4,5-triphenyl imidazole. Preferred compositions consist of a polymeric material and a minor amount of a compound such as:

(a) 1,4-bis-(4,5-diphenyl-2-imidazolyl)-benzene having the formula:

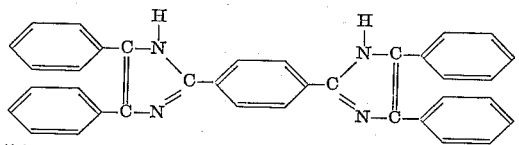

(b) 2-(4-dimethylaminophenyl)-4,5-diphenyl imidazole having the formula:

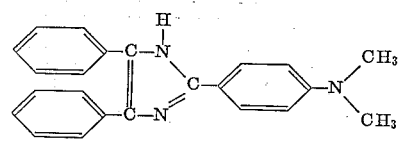

(c) 2-(1-naphthyl)-4,5-diphenyl imidazole, having the formula:

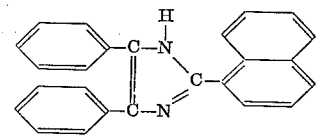

(d) 2-(2-hydroxy-5-tertiarybutyl phenyl)-4,5-diphenyl imidazole, having the formula:

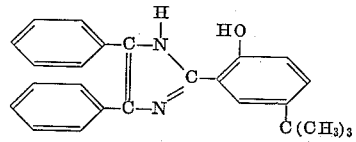

and/or (e) 2-(2 - methoxy phenyl) - 4,5 - diphenyl imidazole, having the formula:

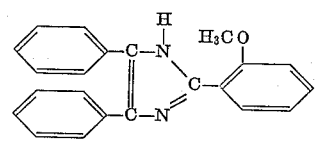

The present invention includes such novel compounds.
The present invention also includes compositions consisting of a polymerical material and a minor amount of at least one derivative of 2,4,5-triphenyl imidazole having the formula of:

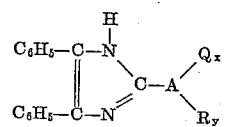

in which A is an aryl group; Q is a substituent selected from the group consisting of hydroxyl, alkoxyl, aroxyl, ortho-substituted $C_4H_2$ moiety of naphthyl, amino-, mono- and dialkylamino-, and 4,5-diphenyl imidazolyl; R is tertiary butyl; $x$ is a number from 1 to 2; $y$ is 0 to 2. Examples of other compounds which absorb ultra-violet light and are within the scope of said formula include the derivatives of 2,4,5-triphenyl imidazole in which the 2-phenyl group has substituents such as: 2-hydroxy; 3-hydroxy; 4-hydroxy; 3-methoxy; 4-methoxy; 2-dimethylamino; and 3-dimethylamino.

The invention is further clarified by reference to a plurality of examples.

*Examples I–V*

A resin kettle of appropriate dimensions can be employed in preparing imidazole derivatives from benzil, ammonia, and an aromatic aldehyde. Data relating to the preparations include:

| Example No | 1 | 2 | 3 | 4 | 5 |
|---|---|---|---|---|---|
| Capacity of kettle, l | 2 | 2 | 0.5 | 2 | 1 |
| Benzil, g | 52.5 | 52.5 | 10.5 | 105 | 35 |
| Acetic acid, ml | 1,000 | 1,000 | 244 | 1,200 | 300 |
| Ammonium acetate, g | 155 | 150 | 30 | 300 | 100 |
| Refluxing hours | 2 | 2 | 5 | 3 | 1 |
| Quenching solution: | | | | | |
| $NH_4OH$, ml | | Some | | 1,620 | 450 |
| $H_2O$, l | | Much | 6 | 12 | 12 |
| Recrystallization solvent | $C_5H_5N$ | $C_5H_5N$ | $C_5H_5N$ | $C_3H_7OH$ | $C_3H_7OH$ |
| M.P., °C | 300 | 262 | 300 | 200 | 211 |
| N theory, percent | 10.6 | 11.4 | 8.1 | 7.6 | 8.6 |
| N found, percent | 10.9 | 12.3 | 7.8 | 6.8 | 8.4 |
| Solubility in solvent, percent: | | | | | |
| Dioxane | 1 | | 2 | | |
| Dimethylformamide | 1 | | 8 | | |
| Dibutylphthalate | + 0.5 | 1 | | 10 | 1 |
| Acetone | | 3 | | | 2 |
| Methyl ethyl ketone | | 3 | 0.5 | 10 | 2 |
| Ethanol | | 2 | | 10 | |
| Benzene | | 1 | 0.3 | 10 | 1 |
| Hexane | | | | | 1 |
| Minimum transmission of ultra-violet, percent | 1 | 0 | 6 | 3 | 2 |
| Range of maximum percent absorption expressed as millimicron wave length: | | | | | |
| Lower | 280 | 220 | 260 | 270 | 265 |
| Upper | 390 | 255 | 360 | 350 | 340 |

In preparing 1,4-bis-(4,5-diphenyl-2-imidazolyl)-benzene in accordance with Example I, 16.7 g. (0.125 mol) of terephthaldehyde was mixed with 52.5 g. (0.25 mol) of benzil and 155 g. (2 mols) of ammonium acetate in 1 liter of acetic acid, and the mixture was heated at reflux temperature for two hours. The reaction mixture was poured into 12 liters of water, which dissolved the acetic acid and by-products and precipitated the product. After drying in a vacuum oven, the product was dispersed in hot pyridine containing a small amount of water, and clarified by a small amount of charcoal, and the thus clarified solution was cooled to recrystallize the compound and the clarification and recrystallization steps were repeated.

Examples II–V followed the same pattern, but employed appropriate aldehydes as indicated.

| Example | Aldehyde | 4,5-diphenylimidazole derivative |
|---|---|---|
| 1 | Terephthaldehyde | 1,4-bis-(4,5-diphenyl-2-imidazolyl)-benzene. |
| 2 | 4-dimethylaminobenzaldehyde. | 2-(4-dimethylaminophenyl)-4,5-diphenyl imidazole. |
| 3 | 1-naphthaldehyde | 2-(1-naphthyl)-4,5-diphenyl imidazole. |
| 4 | 5-t-butyl salicylaldehyde | 2-(2-hydroxy-5-tertiarybutyl phenyl)-4,5-diphenyl imidazole. |
| 5 | 2-methoxy-benzaldehyde | 2-(2-methoxyphenyl)-4,5-diphenyl imidazole. |

The ultra-violet absorbency tests included the steps of: dissolving 0.025 g. of the compound in 1000 ml. of solvent, and noting the percent transmission at various ultra-violet wave lengths throughout the 200 to 400 millimicron (2000 to 4000 angstroms) wave length range. All of the compounds had good absorption characteristics over the range up to the longer wave lengths of about 360 millimicrons or better; and the bis-(4,5-diphenyl-2-imidazolyl)-benzene-1,4 showed good absorption up to 390 millimicrons or better.

*Example VI*

Samples of polymeric-type materials are prepared with the indicated modifications by the incorporation of minor amounts of the aryl-imidazole compounds of each of Examples I–V and subjected to ultra-violet ageing tests including exposures to Fade-O-Meter, G.E. S–1 sun lamp and/or outdoor exposure.

One set of samples is prepared by including in each sample 1.5 parts by weight of one of the arylimidazole compounds of Examples I–V as the ultra-violet absorber plus 100 parts by weight of polyvinyl chloride, dioctyl phthalate, 50: barium-cadmium laurate, 2; and triphenyl phosphite, 1. Similar testing of the effectiveness of the said ultra-violet absorbers is made with low-density polyethylene containing 0.1 to 1.0 weight percent of the absorbers; and in polystyrenes containing 0.25% to 0.5% by weight of such absorbers. Similar tests are made with polyesters prepared from polyester resin catalyzed with 2% benzolyl peroxide and containing 0.25 to 0.5% by weight of these ultra-violet absorbers. A different set of samples is prepared using 78 parts by weight of cellulose acetate (56% combined acetic acid, and viscosity of 50 seconds); 5 parts by weight of triphenyl phosphate; 12 parts by weight of diethylphthalate; 5 parts by weight of dimethylphthalate; and 1 to 3 parts by weight of one or more of the aforesaid ultra-violet absorbers.

The aryl-imidazole compounds of Examples I–V have little, if any, noticeable effect on the strength, appearance and similar physical characteristics of the polymeric-type products even when several times the effective amount is incorporated in the formulation; the effective amount being approximately equivalent to the concentrations employed industrially for ultra-violet absorbers. The results of the aging tests demonstrate resistance to deterioration quite superior to results on similar compositions lacking the ultra-violet absorbers, and superior as well to results to control samples consisting of similar compositions containing effective amounts of commercially marketed ultra-violet absorbers, differing in chemical structure from the structure of the imidazole compounds of this invention.

Samples are prepared consisting of a major amount of polystyrene and a minor amount of an absorber of ultra-violet light. The control samples contain commercially marketed UV absorbers in concentrations of 0.08, 0.1, 0.2, 0.4, 0.8, 1.6, 3.2, 4.8 and 6.0%, and the samples being evaluated contain the same series of concentrations of the triaryl imidazole. The UV absorbers within the scope of the formula $(C_6H_5)_2 C_3N_2HA$ in which A is 3-hydroxyphenyl, 4-hydroxyphenyl, 4-methoxyphenyl, 2-hydroxyphenyl, 2-dimethylaminophenyl, 3-dimethylaminophenyl and 3-methoxyphenyl are shown to be as effective as the commercially marketed absorbers, and a basis is established for the commercial significance of the range from 0.1 to 5% for the concentration of the 2,4,5 triarylimidazole absorbers.

Obviously many modifications and variations of the invention as hereinbefore set forth may be made without departing from the spirit and scope thereof, and therefore only such limitations should be imposed as are indicated in the appended claims.

The invention claimed is:

1. A polymeric material characterized by resistance to deterioration in ultra-violet light which composition consists essentially of polymeric material selected from the group consisting of polyvinyl chloride, polyethylene, polystyrene, polyesters, and cellulose acetate and from 0.10 to 5% by weight of 1,4-bis-(4,5-diphenyl imidazolyl)-benzene as an ultra-violet light absorber.

2. The method of increasing the resistance of polymeric materials selected from the group consisting of polyvinyl chloride, polyethylene, polystyrene, polyesters, and cellulose acetate to sunlight which includes the step of: incorporating as an ultra-violet light absorber in such polymeric material from 0.10 to 5% by weight of 2-(4-dimethylaminophenyl)-4,5-diphenyl imidazole.

3. The method of increasing the resistance of polymeric materials selected from the group consisting of polyvinyl chloride, polyethylene, polystyrene, polyesters, and cellulose acetate to sunlight which includes the step of: incorporating as an ultra-violet light absorber in such polymeric material from 0.10 to 5% by weight of 2-(1-naphthyl)-4,5-diphenyl imidazole.

4. A composition of matter characterized by resistance to deterioration in ultra-violet light and consisting essentially of a major amount of synthetic macromolecular material selected from the group consisting of polyvinyl chloride, polyethylene, polystyrene, polyesters, and cellulose acetate and from 0.25% to 5% by weight of 4,5-diphenyl-2-(2-hydroxy-5-tertiary butyl)-phenyl imidazole.

5. The method of increasing the resistance of polymeric materials selected from the group consisting of polyvinyl chloride, polyethylene, polystyrene, polyesters, and cellulose acetate to sunlight which includes the step of: incorporating as an ultra-violet light absorber in such polymeric material and from 0.25% to 5% by weight of 4,5-diphenyl-2-(2-hydroxy-5-tertiary butyl)-phenyl imidazole.

References Cited by the Examiner

UNITED STATES PATENTS

| | | | |
|---|---|---|---|
| 2,585,388 | 2/52 | Jones | 260—309 |
| 2,654,761 | 10/53 | Huebner et al. | 260—309 |
| 2,713,546 | 7/55 | Williams | 106—176 |
| 2,726,246 | 12/55 | Trosken | 260—302 |
| 2,985,661 | 5/61 | Hein et al. | 252—300 |
| 2,995,540 | 8/61 | Duennenberger et al. | 260—45.8 |
| 3,050,520 | 8/62 | Erner et al. | 252—300 |
| 3,095,422 | 6/63 | Duennenberger et al. | 106—176 |

OTHER REFERENCES

Cotman et al., Proc. Indiana Acad. Sci., vol. 47, pages 124–129 (1938).

Hofman, "Imidazole and Derivatives," Part I (1953), pages 45–47.

MORRIS LIEBMAN, *Primary Examiner.*

JOHN H. MACK, *Examiner.*